United States Patent
Ayabe

(10) Patent No.: US 6,860,833 B2
(45) Date of Patent: Mar. 1, 2005

(54) DRIVING CONTROL APPARATUS FOR VEHICLE AND CONTROL METHOD OF SAME

(75) Inventor: Atsushi Ayabe, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/659,311

(22) Filed: Sep. 11, 2003

(65) Prior Publication Data

US 2004/0058779 A1 Mar. 25, 2004

(30) Foreign Application Priority Data

Sep. 20, 2002 (JP) ........................................ 2002-275254

(51) Int. Cl.[7] .............................................. F16H 59/30
(52) U.S. Cl. ........................................ 477/121; 701/53
(58) Field of Search ................................ 477/118, 121; 701/53–54

(56) References Cited

U.S. PATENT DOCUMENTS

| 4,891,759 A | * | 1/1990 | Kato ........................... 701/54 |
| 6,773,372 B2 | * | 8/2004 | Matsubara et al. ........... 477/78 |
| 2004/0014565 A1 | * | 1/2004 | Oshima et al. .............. 477/182 |
| 2004/0102288 A1 | * | 5/2004 | Ayabe et al. ................. 477/117 |

FOREIGN PATENT DOCUMENTS

| JP | 11-287317 | 10/1999 |
| JP | 11-287318 | 10/1999 |

* cited by examiner

Primary Examiner—Tisha Lewis
(74) Attorney, Agent, or Firm—Oblon, Spivak, McClelland, Maier & Neustadt, P.C.

(57) ABSTRACT

A driving control apparatus for a vehicle which includes an engine which generates power by fuel combustion; a transmission which changes engagement/disengagement states of plural frictional engagement devices so as to realize plural shift speeds whose gear ratios are different from each other; a fuel cut device which stops fuel supply to the engine when a predetermined fuel cut condition including a condition that the vehicle is coasting with a throttle valve of the engine being fully closed is satisfied; a coasting time disengagement restricting device which maintains a high speed side frictional engagement device in an engagement state until a low speed side frictional engagement device obtains a predetermined torque capacity at the time of automatic downshifting of the transmission during coasting; and a disengagement restriction stop device which stops control by the coasting time engagement restricting device so as to reduce a torque capacity of the high speed side frictional engagement device, when control by the fuel cut device is cancelled and fuel supply is restarted in the case where downshifting of the transmission is output while fuel supply is stopped by the fuel cut device and the high speed side frictional engagement device is maintained in the engagement state by the coasting time disengagement restricting device.

14 Claims, 10 Drawing Sheets

F I G. 2

| POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | X | X | X | X | X | X | O | X | X |
| R | | X | X | O | X | O | X | O | X | X |
| D | 1st | O | X | X | X | X | X | O | O | △ |
| | 2nd | O | X | X | O | X | X | O | X | △ |
| | 3rd | O | O | X | X | X | X | O | X | △ |
| | 4th | X | O | X | O | X | X | O | X | △ |
| | 5th | X | O | X | O | X | O | X | X | X |
| 1stENGINE BRAKE | | O | X | X | X | O | X | O | △ | △ |

DRIVING CONTROL APPARATUS FOR VEHICLE AND CONTROL METHOD OF SAME

INCORPORATION BY REFERENCE

The disclosure of Japanese Patent Application No. 2002-275254 filed on Sep. 20, 2002, including the specification, drawings and abstract is incorporated herein by reference in its entirety.

BACKGROUND OF THE INVENTION

1. Field of the Invention

The invention relates to a driving control apparatus and a control method for a vehicle. More particularly, the invention relates to downshifting control when a vehicle is coasting with a throttle valve being fully closed.

2. Description of the Related Art

A driving control apparatus for a vehicle is known which includes (a) an engine which generates power by fuel combustion, (b) a transmission which changes engagement/disengagement states of plural frictional engagement devices so as to realize plural speeds whose gear ratios are different from each other, and (c) a coasting time disengagement restricting device for maintaining a high speed side frictional engagement device in an engagement state until a low speed side frictional engagement device obtains a predetermined torque capacity at the time of automatic downshifting of the transmission when the vehicle is coasting with a throttle valve of the engine being fully closed. For example, a driving control apparatus for a vehicle disclosed in Japanese Patent Laid-Open Publication No. 11-287317 is known (refer to claim 6, and FIG. 7). When a predetermined fuel cut condition including a condition that the vehicle is coasting is satisfied, fuel supply to the engine is stopped (fuel cut is performed) for enhancing fuel economy, which is widely adopted. An example of such a driving control apparatus for a vehicle is disclosed in Japanese Patent Laid-Open Publication No. 9-53718.

However, in the above-mentioned driving control apparatus for a vehicle, in the case where downshifting of the transmission is output when fuel cut is performed during coasting, and the high speed side frictional engagement device is maintained in the engagement state by the coasting time disengagement restricting device, when fuel cut is cancelled by an accelerator operation or the like and fuel supply is restarted, problems may occur that an input rotational speed of the transmission is hindered from increasing due to engagement of the high speed side frictional engagement device, which results in an occurrence of shift shock and an increase in the shifting time.

SUMMARY OF THE INVENTION

The invention is made in the light of the above-mentioned circumstances. It is an object of the invention to provide a driving control apparatus for a vehicle which prevents an occurrence of shift shock and an increase in shifting time, when fuel cut is cancelled and fuel supply is restarted while a high speed side frictional engagement device is maintained in an engagement state by a coasting time disengagement restricting device during downshifting in a fuel cut state at the time of coasting.

As an embodiment of the invention, a driving control apparatus for a vehicle including a) an engine which generates power by fuel combustion, (b) a transmission which changes engagement/disengagement states of plural frictional engagement devices so as to realize plural shift speeds whose gear ratios are different from each other, (c) a fuel cut device which stops fuel supply to the engine when a predetermined fuel cut condition including a condition that the vehicle is coasting with a throttle valve of the engine being fully closed is satisfied, and (d) a coasting time disengagement restricting device which maintains a high speed side frictional engagement device in an engagement state until a low speed side frictional engagement device obtains a predetermined torque capacity at the time of automatic downshifting of the transmission during coasting, further includes (e) a disengagement restriction stop device which stops control by the coasting time disengagement restricting device so as to reduce a torque capacity of the high speed side frictional engagement device, when control by the fuel cut device is cancelled and fuel supply is restarted in the case where downshifting of the transmission is output while fuel supply is stopped by the fuel cut device and the high speed side frictional engagement device is maintained in the engagement state by the coasting time disengagement restricting device.

According to another aspect of the invention, a control method of a driving control apparatus for a vehicle including an engine which generates power by fuel combustion, a transmission which changes engagement/disengagement states of plural frictional engagement devices so as to realize plural shift speeds whose gear ratios are different from each other, includes the steps of: stopping fuel supply to the engine when a predetermined fuel cut condition including a condition that the vehicle is coasting with a throttle valve of the engine being fully closed is satisfied; maintaining a high speed side frictional engagement device in an engagement state until a low speed side frictional engagement device obtains a predetermined torque capacity at the time of automatic downshifting of the transmission during coasting; and stopping control for maintaining the engagement state of the high speed side frictional engagement device during coasting so as to reduce the torque capacity of the high speed side frictional engagement device when control of the fuel cut is cancelled and fuel supply is restarted in the case where downshifting of the transmission is output while fuel supply is stopped and the high speed side frictional engagement device is maintained in the engagement state.

The low speed side frictional engagement device is disengaged in a high speed side shift speed before downshifting, and is engaged in a low speed side shift speed which is realized by downshifting. The high speed side frictional engagement device is engaged in the high speed side shift speed before downshifting, and is disengaged in the low speed side shift speed which is realized by downshifting.

In the above-mentioned driving control apparatus for a vehicle and the control method thereof, in the case where downshifting of the transmission is output while fuel supply is stopped by the fuel cut device, and the high speed side frictional engagement device is maintained in the engagement state by the coating time disengagement restricting device, when the control by the fuel cut device is cancelled and fuel supply is restarted, an input rotational speed of the transmission is promptly increased based on an increase in an engine speed due to restart of fuel supply and an engagement torque capacity of the low speed side frictional engagement device, since the control by the coasting time disengagement restricting device is stopped and the torque capacity of the high speed side frictional engagement device is reduced by the disengagement restriction stop device. As a result, an occurrence of shift shock and an increase in shifting time are prevented.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which

FIG. 2 is a table showing relationships between combinations of operation states of plural hydraulic frictional engagement devices, and shift speeds which are realized by the combinations;

DETAILED DESCRIPTION OF THE EXEMPLARY EMBODIMENTS

Figure 1:
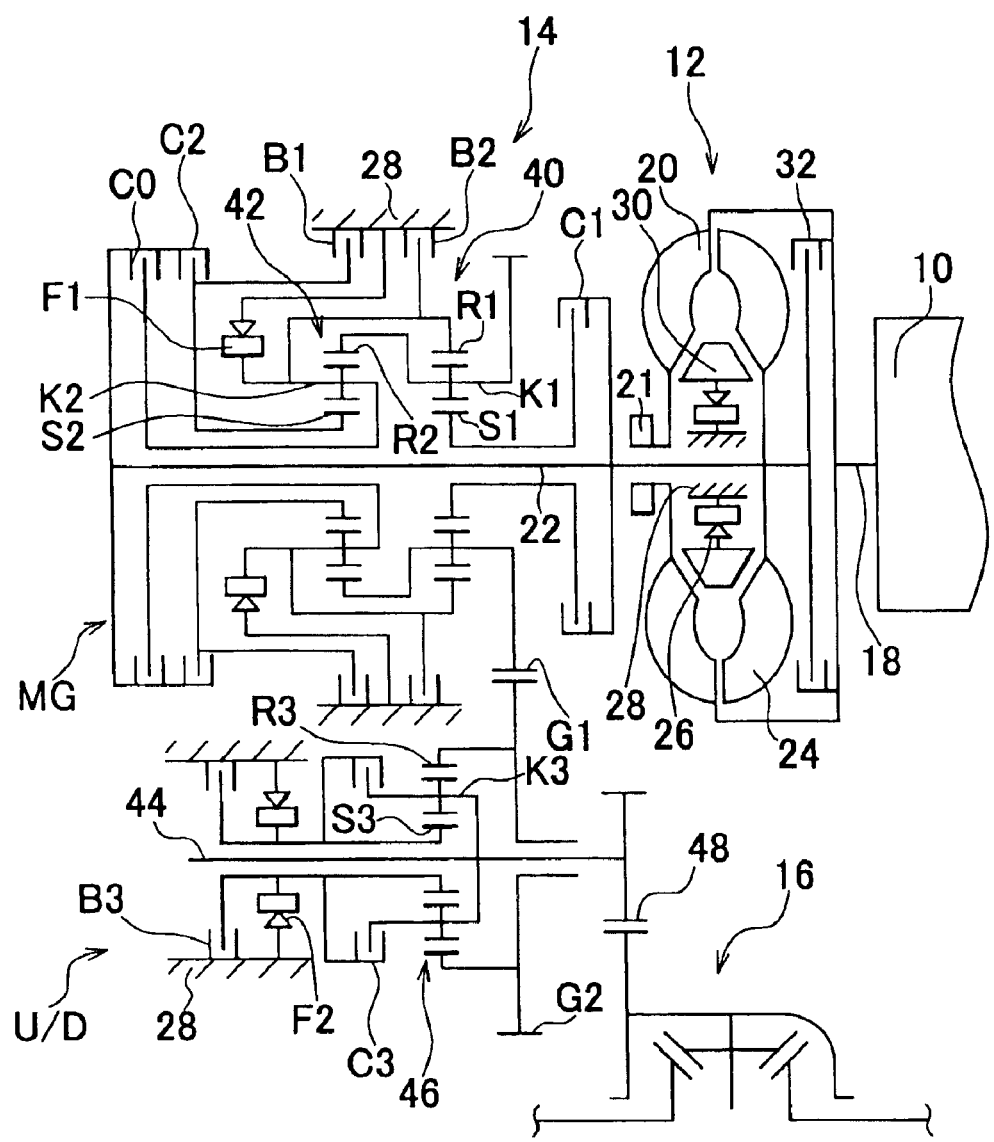
FIG. 1 is a schematic diagram showing a driving control apparatus for a vehicle to which an embodiment of the invention is applied.

A driving control apparatus for a vehicle according to the invention is applied to a vehicle which includes an engine as a drive power source for running. However, the driving control apparatus may be applied to a hybrid vehicle or the like which includes another drive power source such as an electric motor in addition to an engine. The engine includes a fuel injector or the like which can automatically stops fuel supply using a fuel cut device. As a throttle valve which adjusts an intake air amount, an electronic throttle valve is preferably employed whose opening/closing can be electrically controlled. However, a throttle valve may be employed whose opening/closing is mechanically performed according to an accelerator operation (an output request) performed by a driver.

As a transmission, for example, an automatic transmission of a planetary gear type is preferably employed in which rotational elements of plural planetary gear devices are engaged/disengaged by a frictional engagement device such that plural forward shift speeds are realized. The invention is applied to downshifting by so-called clutch-to-clutch shifting, that is, downshifting performed by disengaging a high speed side frictional engagement device and engaging a low speed side frictional engagement device. Various types of transmissions can be employed in which downshifting is performed by disengaging one of a pair of frictional engagement devices and engaging the other, for example, a biaxial type gear mesh transmission in which downshifting is performed by changing plural input clutches (frictional engagement devices) can be employed. As a frictional engagement device, for example, a hydraulic frictional engagement device is preferably employed which is engaged by a hydraulic actuator. In this case, an engagement state can be controlled by hydraulic control using duty control of linear solenoid valves. However, a frictional engagement device can be employed which controls an engagement state using electromagnetic force or the like, instead of using hydraulic pressure.

The transmission is configured such that a reverse input from a drive wheel side is transmitted to an engine side and an engine speed is increased. However, it is not necessary that the reverse input be transmitted in all the forward shift speeds. Various configurations may be adopted such as a configuration in which a reverse input is transmitted in only part of the forward shift speeds on the high speed side, and a configuration in which a reverse input is transmitted only in a predetermined condition such as in a sport mode.

The transmission is configured such that plural forward shift speeds can be automatically changed using, for example, operation states such as a vehicle speed and a throttle valve opening as parameters. For downshifting when the vehicle is coasting with the throttle valve being fully closed, a vehicle speed during downshifting at the time of coasting (hereinafter, referrer to as a "coasting-downshifting time vehicle speed") is set for each forward shift speed such that fuel cut is continuously performed. More particularly, the coasting-downshifting time vehicle speed may be set according to an F/C return speed and a gear ratio of each forward shift speed such that downshifting is performed before the engine speed reaches the F/C return speed, and the engine speed is increased due to the downshifting. The F/C return speed is an engine speed at which fuel cut is cancelled and fuel supply is restarted. For example, the F/C return speed is set to be a speed approximately equal to an idle speed such that the engine can operate by itself immediately due to explosion.

It is preferable that a hydrodynamic power transmission device, which transmits power via fluid and includes a lockup clutch, such as a torque converter and a fluid coupling, be provided between the engine and the transmission. In this case, it is preferable to provide a coating time lockup engagement device which engages (including slip-engagement) the lockup clutch so as to increase the engine speed, in order to prevent, as much as possible, cancellation of fuel cut (stop of fuel supply) due to a decrease in the engine speed during coasting.

The coasting time disengagement restricting device is configured to maintain a predetermined constant torque capacity, which is as small as possible within a range in which a decrease in the input rotational speed due to the neutral state of the transmission can be prevented. However, various configurations can be adopted, for example, a configuration in which feedback-control is performed such that the input rotational speed is equal to a predetermined target rotational speed.

The disengagement restriction stop device decrease the torque capacity of the high speed side frictional engagement device to zero so as to completely disengage the high speed side frictional engagement device. However, the disengagement restriction stop device may decrease the torque capacity to a predetermined value at which the input rotational speed is permitted to increase based on the restart of fuel supply to the engine and the engagement torque capacity of the low speed side frictional engagement device.

The disengagement restriction stop device may stop control by the coasting time disengagement restricting device every time fuel supply is restarted so as to reduce the torque capacity of the high speed side frictional engagement device. Various configuration may be adopted in which control for decreasing the torque capacity is performed only when a predetermined condition is satisfied, for example, (a) when fuel supply is restarted before downshifting proceeds to a predetermined level, (b) when fuel supply is restarted in the case where the torque capacity of the high speed side frictional engagement device is equal to or larger than a predetermined value, (c) when fuel supply is restarted in the case where control for decreasing the torque capacity of the high speed side frictional engagement device (for example, drain control of hydraulic pressure) has not been performed for a predetermined time, and (d) when fuel supply is restarted in the case where control for decreasing the torque capacity of the high speed side frictional engagement device has not been completed.

In the following description and the accompanying drawings, the present invention will be described in more detail with reference to exemplary embodiments.

FIG. 1 is a block diagram showing a driving device for a transversely-mounted type of vehicle such as an FF (front engine front drive) vehicle. An output from an engine 10 such as a gasoline engine which generates power by fuel combustion is transmitted to a drive wheel (a front wheel) (not shown) via a torque converter 12, an automatic transmission 14 and a differential gear 16. The torque converter 12 is a hydrodynamic power transmission device which transmits power via fluid, and includes a pump impeller coupled with a crank shaft 18 of the engine 10, a turbine runner 24 coupled with an input shaft 22 of the automatic transmission 14, a stator 30 fixed to a housing 28, that is a non-rotating member, via a one-way clutch 26, and a lockup clutch 32 which directly couples the crank shaft 18 with the input shaft 22 via a damper (not shown). An mechanical oil pump 21 such as a gear pump is coupled with the pump impeller 20, and is rotationally-driven with the pump impeller 20 by the engine 10 so as to generate a hydraulic pressure for shifting and lubrication.

The lockup clutch 32 is a hydraulic frictional clutch which is frictionally engaged due to a pressure difference $\Delta P$ between a hydraulic pressure in an engagement side oil chamber and a hydraulic pressure in a disengagement side oil chamber. When the lockup clutch 32 is fully engaged, the pump impeller 20 and the turbine runner 24 are integrally rotated. When the pressure difference $\Delta P$, that is, an engagement torque, is feedback-controlled such that the lockup clutch 32 is engaged in a predetermined slip state, the turbine runner 24 can be rotated in accordance with the pump impeller 20 at a predetermined slip amount, for example, approximately 50 rpm during driving. Meanwhile, the pump impeller 20 can be rotated in accordance with the turbine runner 24 at a predetermined slip amount, for example, approximately −50 rpm during reverse input.

The automatic transmission includes a pair of a first planetary gear device 40 and a second planetary gear device 42 of a single pinion type, which is provided coaxially on the input shaft 22, and which forms a planetary gear device of a so-called CR—CR coupling when a carrier and a ring gear are coupled with each other; a set of third planetary gear device 46 which is provided coaxially on a counter shaft 44 that is in parallel with the input shaft 22; and an output gear 48 which is fixed at an end of the counter shaft 44 and is engaged with the differential gear device 16. The components of each of the planetary gear devices 40, 42, 46, that are, a sun gear, the ring gear and the carrier which rotatably supports the pinion gears that are engaged with the sun gear and the ring gear are selectively coupled with each other by four clutches, C0, C1, C2, C3, or are selectively coupled with the housing 28, which is a non-rotating member, by three brakes B1, B2, B3. Also, the sun gear, the ring gear and the carrier are engaged with the housing 28 according to the rotation direction by two one-way clutches F1, F2. Since the differential gear device 16 is configured so as to be symmetrical with respect to an axis line (an axle), the lower portion is omitted in FIG. 1.

A main shifting portion MG, which realizes forward four speeds and a reverse one speed, includes a pair of the first planetary gear device 40, and the second planetary gear device 42, clutches C0, C1, C2, brakes B1, B2 and the one-way clutch F1, which are provided coaxially on the input shaft 22. A sub shifting portion, that is, an under drive portion U/D includes the set of planetary gear device 46, the clutch C3, the brake B3, and the one-way clutch F2, which are provided on the counter shaft 44. In the main shifting portion MG, the input shaft 22 is coupled with a carrier K2 of the second planetary gear device 42, a sun gear S1 of the first planetary gear device 40, a sun gear S2 of the second planetary gear device 42 via the clutches C0, C1, C2. A ring gear R1 of the first planetary gear device 40 and the carrier K2 of the second planetary gear device 42 are coupled with each other. A ring gear R2 of the second planetary gear device 42 and a carrier K1 of the first planetary gear device 40 are coupled with each other. The sun gear S2 of the second planetary gear device 42 is coupled with the housing 28, which is a non-rotating member, via the brake B1. The ring gear R1 of the first planetary gear device 40 is coupled with the housing 28, which is a non-rotating member, via the brake B2. A two-way clutch F1 is provided between the carrier K2 of the second planetary gear device 42 and the housing 28, which is a non-rotating member. A first counter gear G1 which is fixed to the carrier K1 of the first planetary gear device 40 and a second counter gear G2 which is fixed to a ring gear R3 of the third planetary gear device 46 are engaged with each other. In the under drive portion U/D, a carrier K8 and a sun gear S3 of the third planetary gear device 46 are coupled with each other via a clutch C3. The brake B3 and the one-way clutch F2 are provided in parallel between the sun gear S3 and the housing 28, which is a non-rotating member.

Figure 8:
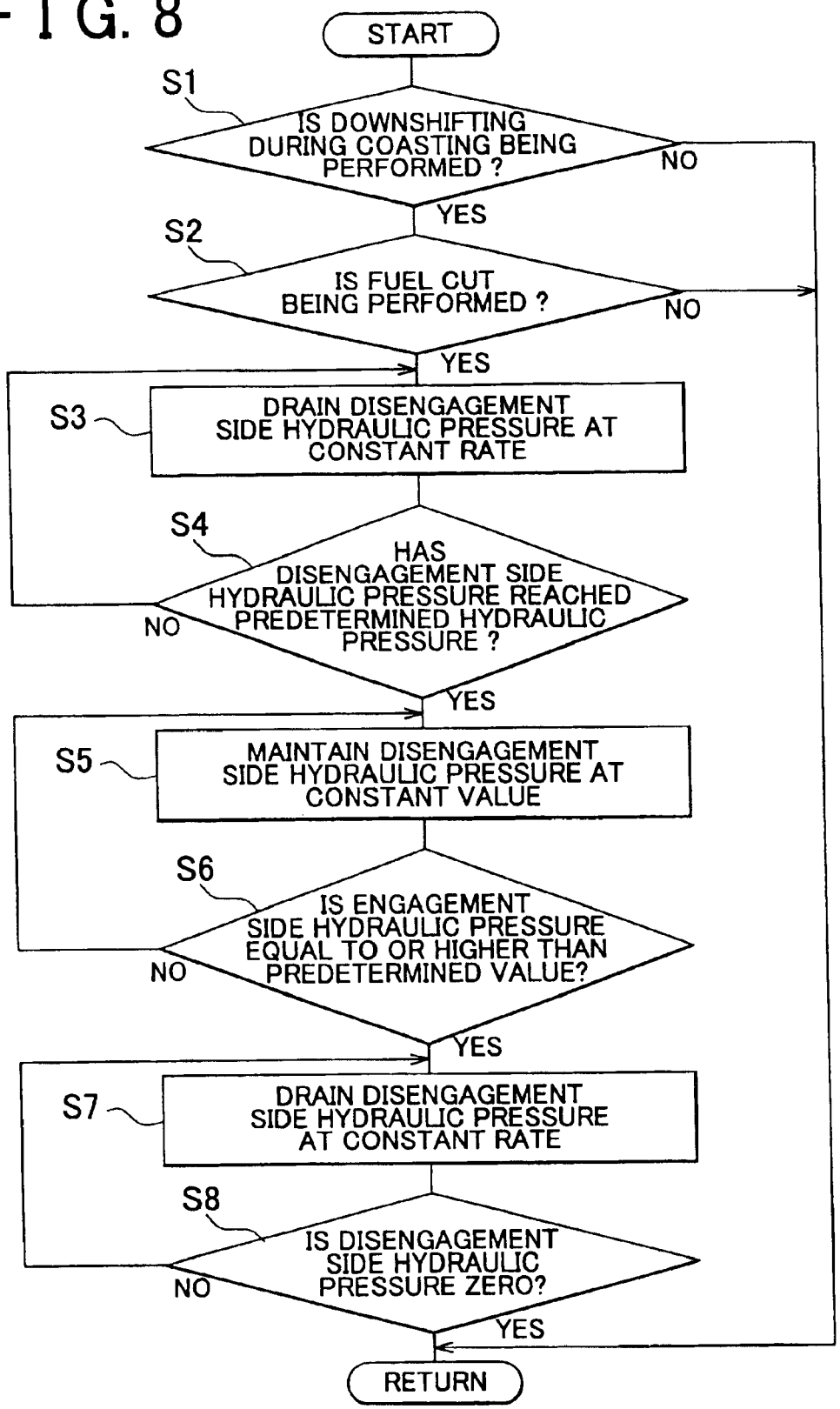
FIG. 8 is a flowchart specifically explaining processes performed by a coasting-downshifting time disengagement hydraulic control device in FIG. 5.

The clutches C0, C1, C2, C3 and the brakes B1, B2, B3 (hereinafter, simply referred to as the clutch C, and the brake B unless they need to be distinguished from each other) are hydraulic frictional engagement devices such as a multiple disc clutch and a band brake, whose engagement is controlled by hydraulic actuators. When hydraulic circuits are switched by excitation/nonexcitation of linear solenoids SL1, SL2, SL3, SLT and solenoids DSL, S4, SR of a hydraulic control circuit 98 (refer to FIG. 3), or by a manual valve, the engagement/disengagement state is changed, for example, as shown in FIG. 2. The forward five speeds, the reverse one speed and neutral are realized according to the position of a shift lever 72 (refer to FIG. 8). In FIG. 2, "1st" signifies the forward first speed. Similarly, "2nd" to "5th" signify the forward second speeds to fifth speed. A circle signifies engagement, an X signifies disengagement, and a triangle signifies engagement which is not related to power transmission. The shift lever 72 is operated so as to be in one of a parking position "P", a reverse running position "R", a neutral position "N", forward running positions "D", "4", "3", "2", "L". In the positions "P" and "N", neutral is realized as a non-driving shift speed for interrupting power transmission. In the position "P", rotation of the drive wheel is mechanically hindered by a mechanical parking brake (not shown).

In FIG. 2, in second speed to fifth speed, an engine brake is operated when a reverse input from the drive wheel side is transmitted to the engine 10 side. Shifting among these speeds is realized by so-called clutch-to-clutch shifting which is performed by disengaging one of the two frictional engagement devices and engaging the other. For example, shifting from third speed to fourth speed is realized by disengaging the clutch C1 and engaging the brake B1, and shifting from fourth speed to third speed is realized by disengaging the brake B1 and engaging the clutch C1. Even in first speed, the engine brake is effective by engaging the brake B2. In this case, shifting to second speed is performed by clutch-to-clutch shifting.

Figure 3:
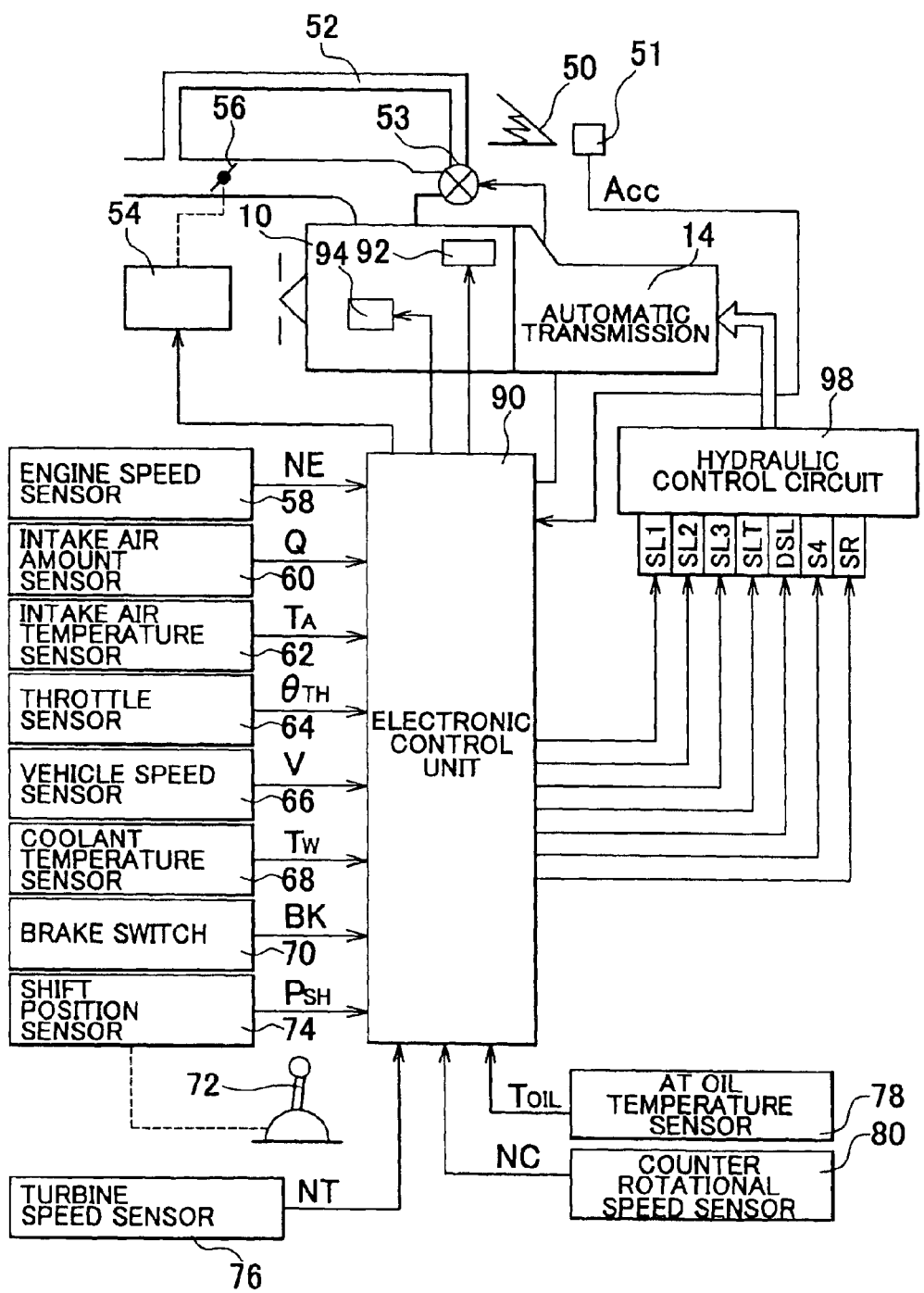
FIG. 3 is a block diagram showing a main portion of a control system included in the driving control apparatus for a vehicle in FIG. 1.
Figure 4:
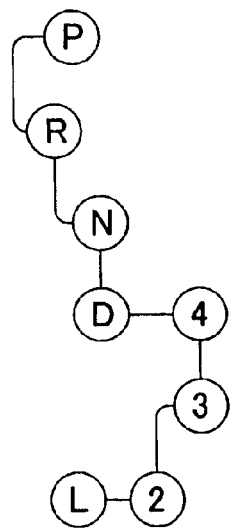
FIG. 4 is a view showing shift positions of a shift lever in FIG. 3.

FIG. 3 is a block diagram showing a control system provided in the vehicle for controlling the engine 10, the automatic transmission 14 and the like in FIG. 1. An operation amount Acc of an accelerator pedal 50 is detected by an accelerator operation amount sensor 51. The accelerator pedal 50 is depressed according to an output amount required by the driver. The accelerator pedal 50 corresponds to an accelerator operation member, and the accelerator pedal operation amount Acc corresponds to the required output amount. An electronic throttle valve 56, whose opening is controlled by an throttle actuator 54 so as to be an opening $\theta_{TH}$ corresponding to the accelerator pedal operation amount Acc, is provided in an intake pipe of the engine 10. An ISC (idle speed control) valve 53, which controls an intake air amount when the electronic throttle valve 56 is fully opened so as to control an idle speed $NE_{IDL}$ of the engine 10, is provided in a bypass passage 52 for bypassing the electronic throttle valve 56 for idle speed control. In addition, there are provided an engine speed sensor 58 for detecting a speed NE of the engine 10, an intake air amount sensor 60 for detecting an intake air amount Q of the engine 10, an intake air temperature sensor 62 for detecting a temperature $T_A$ of the intake air, a throttle sensor 64 with an idle switch for detecting a fully closed state (an idle state) of the electronic throttle valve 56 and an opening $\theta_{TH}$ thereof, a vehicle speed sensor 66 for detecting a vehicle speed V (corresponding to a rotational speed $N_{OUT}$ of the counter shaft 44), a coolant temperature sensor 68 for detecting a coolant temperature $T_W$ for the engine 10, a brake switch 70 for detecting an operation of the brake, a shift position sensor 74 for detecting a shift position (an operation position) $P_{SH}$ of the shift lever 72, a turbine speed sensor 76 for detecting a turbine speed NT (i.e., a rotational speed $N_{IN}$ of the input shaft 22), an AT oil temperature sensor 78 for detecting an AT oil temperature $T_{OIL}$ which is a temperature of operating oil in the hydraulic control circuit 98, a counter rotational speed sensor 80 for detecting a rotational speed NC of the first counter gear G1, and the like. A signal indicative of engine speed NE is supplied from the engine speed sensor 58 to an electronic control unit 90. Similarly, signals indicative of the intake air amount Q, the intake air temperature TA, the throttle valve opening $\theta_{TH}$, the vehicle speed V, the engine coolant temperature $T_W$, the brake operation state BK, the shift position $P_{SH}$ of the shift lever 72, the turbine speed NT, the AT oil temperature $T_{OIL}$, the counter rotational speed NC, and the like are supplied to the electronic control unit 90.

Figure 5:
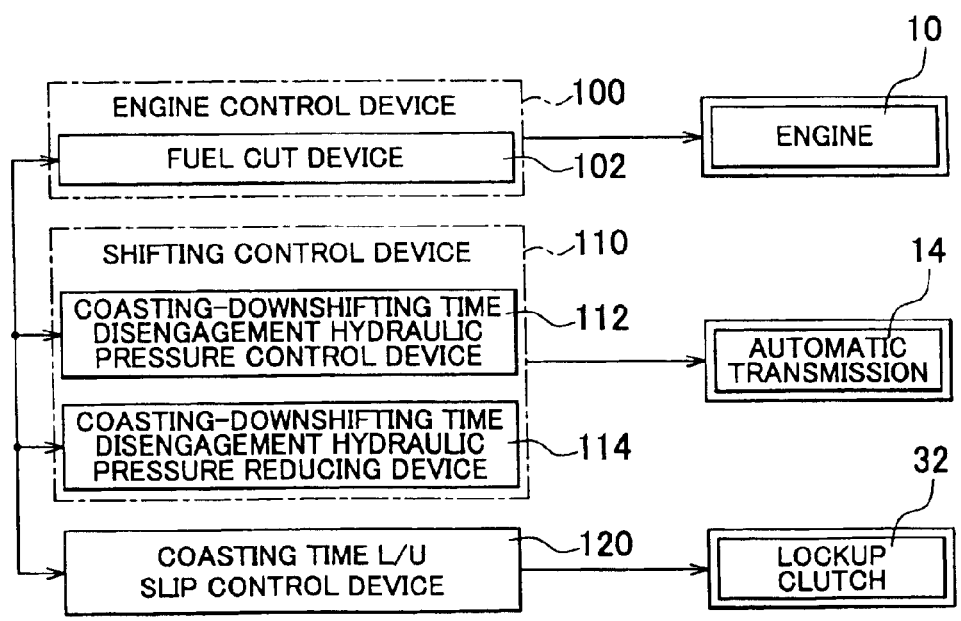
FIG. 5 is a block diagram showing main portions of an electronic control unit in FIG. 3.

The electronic control unit 90 is provided with a so-called microcomputer including a CPU, RAM, ROM, and an input/output interface and the like. The CPU performs signal process according to a program stored in the ROM in advance while using a temporary storage function of the RAM so as to perform output control of the engine 10, shifting control of the transmission 14, slip control of the lockup clutch 32, and the like. The CPU for the engine control and the CPU for the transmission control are configured separately as required. FIG. 5 is a block diagram explaining functions performed by the signal process by the electronic control unit 90. Functionally, there are provided an engine control device 100, a shifting control device 110, and a coasting time L/U (lockup) slip control 120. The engine control device 100 further includes a fuel cut device 102, and the shifting control device 110 further includes a coasting-downshifting time disengagement hydraulic pressure control device 112, and a coasting-downshifting time disengagement hydraulic pressure reducing device 114.

Figure 6:
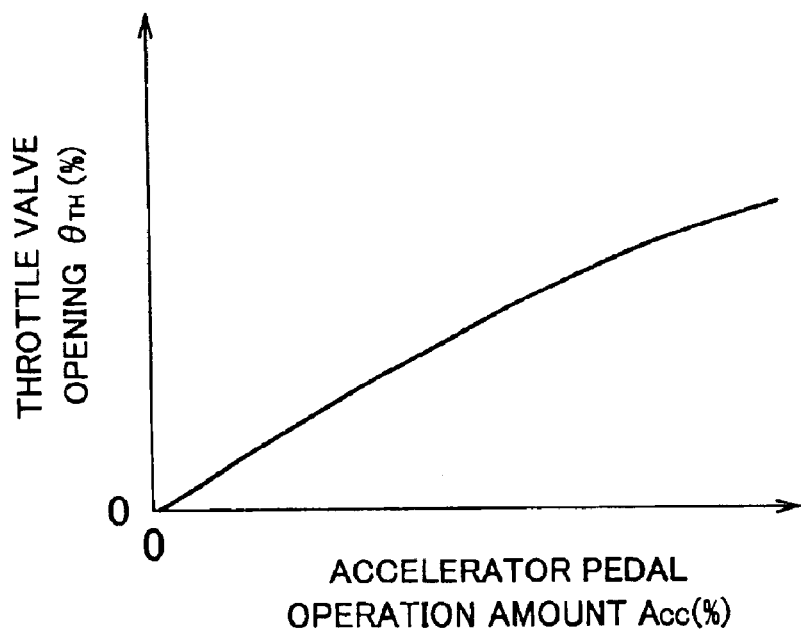
FIG. 6 is a graph showing a relationship between a throttle valve opening of an electronic throttle valve controlled by an engine control device, and an accelerator operation amount.

The engine control device 100 basically controls the output from the engine 10. In addition, the engine control device 100 controls opening/closing of the electronic throttle valve 56 using a throttle actuator 54, controls a fuel injector 92 so as to control a fuel injection amount, controls an ignition device 94 such as an ignitor so as to control ignition timing, and controls the ISC valve 53 so as to control an idle speed. In the control of the electronic throttle valve 56, the throttle actuator 54 is driven based on an actual accelerator pedal operation amount Acc, and the throttle valve opening $\theta_{TH}$ is increased with an increase in the accelerator pedal operation amount Acc, according to a relationship shown in FIG. 6.

The fuel cut device 102 stops fuel supply to the engine 10 so as to enhance fuel economy when the vehicle is running at the throttle valve opening $\theta_{TH}$ of substantially zero, that is, when the vehicle is coasting forward. When a predetermined fuel cut start condition is satisfied, the fuel cut device 102 starts fuel cut for stopping fuel supply by the fuel injection valve 92. When a fuel cut cancellation condition is satisfied, the fuel cut device 102 cancels fuel cut and restarts fuel supply by the fuel injection valve 92, and starts the engine 10 promptly. The fuel cut cancellation condition includes a condition that the engine speed NE is lower than an F/C return speed $NE_{FC}$, a condition that the accelerator pedal 50 is depressed and the accelerator operation amount Acc is not substantially zero, and the like. The F/C return speed $NE_{FC}$ is a speed at which the engine 10 can operate by itself promptly due to the restart of fuel supply. The F/C return speed $NE_{FC}$ is set to be a predetermined fixed value, for example, in consideration of a change in an engine load due to operations of auxialaries, such as an air conditioner. However, the F/C return speed $NE_{FC}$ may be set using the engine load and the like as parameters. The fuel cut start condition may be a counter condition of the fuel cut cancellation condition. Alternatively, the fuel cut start condition may be a condition that the engine speed NE is equal to or higher than a speed which is higher than the F/C return speed $NE_{FC}$ by a predetermined amount or by a predetermined rate, a condition that the accelerator OFF state where the accelerator operation amount is substantially zero has continued for a predetermined time or more, or the like, such that a predetermined hysteresis is provided. Also, another condition such as a condition that the engine coolant temperature $T_W$ is equal to or higher than a predetermined value may be set as the start condition. A condition that the fuel cut start condition is satisfied and the fuel cut cancellation condition is not satisfied corresponds to the fuel cut condition.

Figure 7:
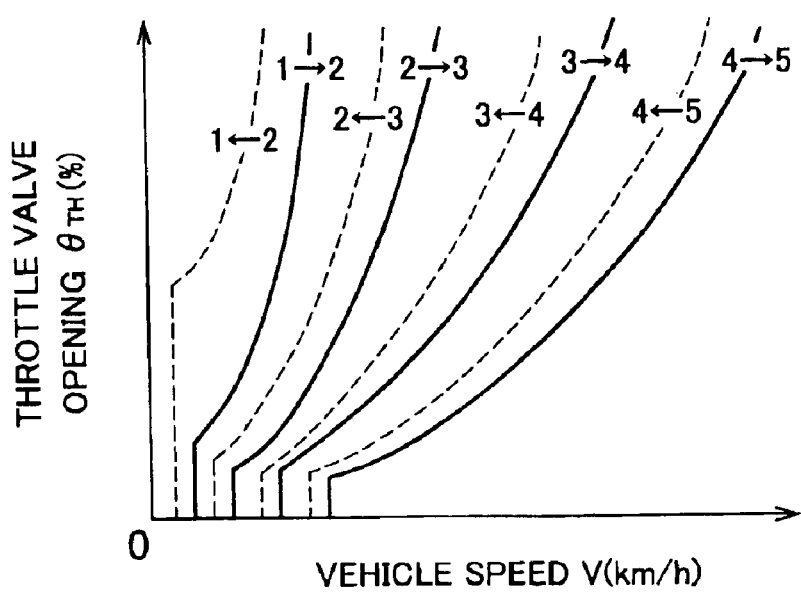
FIG. 7 is a graph showing an example of a shift map for automatically changing a shift speed of an automatic transmission by a shift control in FIG. 5 according to an operation state.

The shifting control device 110 performs shifting control of the automatic transmission 14 according to the shift position $P_{SH}$ of the shift lever 72. For example, in the position "D", the shifting control is performed using all the forward shift speeds, which are first speed "1st" to fifth speed "5th". In the shifting control, the shift speed of the automatic transmission 14 is decided based on the actual throttle valve opening $\theta_{TH}$ and the vehicle speed V according to a pre-stored shift map (a shift condition) shown in FIG. 7, states of the solenoids DSL, S4, SR of the hydraulic control circuit 98 are switched between ON (excitation) and OFF (nonexcitation) states, and the excitation states of the linear solenoids SL1, SL2, SL3, SLT are continuously changed by duty control or the like, such that the decided shift speed is realized. The linear solenoid SL1 is configured to directly control the engagement hydraulic pressure of the brake B1, the linear solenoid SL2 is configured to directly control the engagement hydraulic pressure of the clutch C0, and the linear solenoid SL3 is configured to directly control the engagement hydraulic pressure of the clutch C1. The linear solenoids SL1, SL2, SL3 adjust and control the hydraulic pressures of the brake B1, the clutch C0 and the clutch C1 such that a shift shock such as a change in driving force does not occur, and durability of a friction member is not impaired. In FIG. 7, a solid line is a line indicative of upshifting, and a dashed line is a line indicative of downshifting. As the vehicle speed V decreases or the throttle valve opening $\theta_{TH}$ increases, the shift speed is changed to a low speed side shift speed whose a gear ratio (=input rotational speed $N_{IN}$/output rotational speed $N_{OUT}$) is large. The reference numerals "1" to "5" in the figure denote the first shift speed "1st" to the fifth shift speed "5th", respectively.

The coasting time L/U slip control device 120 feedback-controls the linear solenoid valve related to the pressure difference ΔP such that the lockup clutch 32 is engaged at a predetermined target slip amount SLP (for example, approximately −50 rpm) when the vehicle is coasting forward at the throttle valve opening $\theta_{TH}$ Of substantially zero. The slip control is performed in a shift speed in which the reverse input from the drive wheel side is transmitted to the engine 10 side, that is, a shift speed in which engine brake effect can be obtained. When the lockup clutch 32 is slip-engaged, the engine speed NE is increased to approximately the turbine speed NT. Accordingly, a fuel cut region (a vehicle speed region) in which fuel supply to the engine 10 is stopped expands, which enhances fuel economy. The coasting time L/C slip control device 120 corresponds to the coasting time lockup engagement device. The lockup clutch 32 is fully engaged in a full engagement region, and is slip-engaged in a slip engagement region, which are set using the throttle valve opening $\theta_{TH}$ and the vehicle speed V as parameters.

The shifting control device 110 makes determination for downshifting according to the coasting-downshifting time vehicle speed, which is set independently of the shift map in FIG. 7, and performs downshifting of the automatic transmission 14, when the vehicle is coasting forward at the throttle valve opening $\theta_{TH}$ of substantially zero and the lockup clutch 32 is slip-controlled by the coasting time L/U slip control device 120. The coasting-downshifting time vehicle speed is set for each shift speed according to the gear ratio of each forward shift speed, such that fuel cut by the fuel cut device 102 is continued, that is, downshifting is performed before the engine speed NE reaches the F/C return speed $NE_{FC}$.

Figure 10:
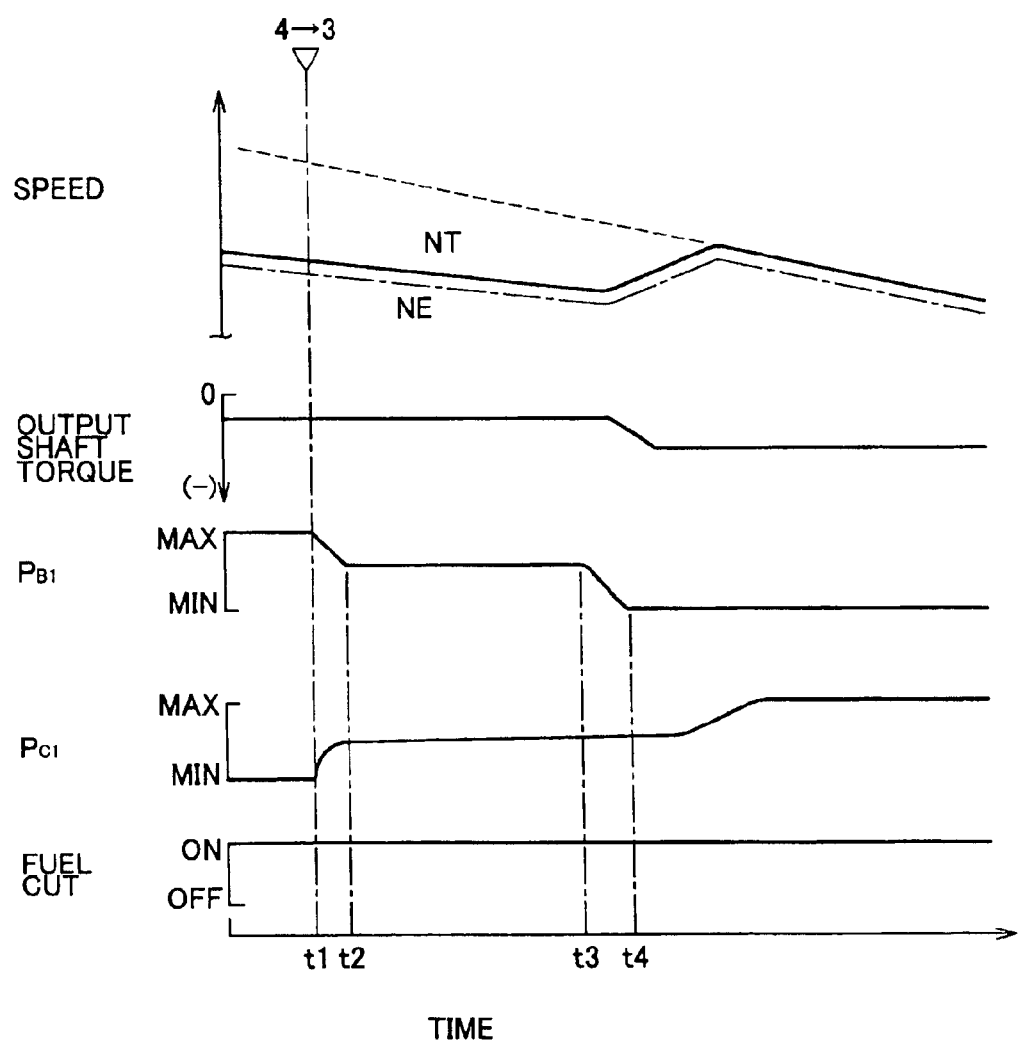
FIG. 10 is an example of a time chart explaining changes in operation states of various portions when a disengagement side hydraulic pressure is controlled according to the flowchart in FIG. 8 during downshifting at the time of coasting.

During downshifting at the time of coasting, hydraulic control by the disengagement side frictional engagement device, that is, the high speed side frictional engagement device is performed by the coasting-downshifting time disengagement hydraulic control device 112. The hydraulic control is performed, for example, according to a flowchart shown in FIG. 8. In step S1, it is determined whether the shifting is downshifting at the time of coasting. In step S2, it is determined fuel cut is being performed by the fuel cut device 102, using a control execution flag or the like. When affirmative determinations are made in steps S1, S2, the disengagement side hydraulic pressure is drained at a constant rate in step S3. In step S4, it is determined whether the disengagement side hydraulic pressure has reached a predetermined hydraulic pressure. The predetermined hydraulic pressure is a hydraulic pressure value at which a torque capacity can be obtained for preventing decreases in the turbine speed NT and the engine speed NE due to the neutral state of the automatic transmission 14. For example, a constant value is set in advance for each type of downshifting. FIG. 10 is an example of a time chart showing changes in operation states of various portions during downshifting from fourth speed to third speed at the time of coasting. When the brake B1 as the disengagement side frictional engagement device, that is, as the high speed side frictional engagement device is disengaged, and the clutch C1 as the engagement side frictional engagement device, that is, as the low speed side frictional engagement device is engaged, time $t_1$ signifies a time at which downshifting from fourth speed to third speed is output, and time $t_2$ signifies a time at which the disengagement side hydraulic pressure $P_{B1}$ decreases to the predetermined hydraulic pressure and an affirmative determination is made in step S4.

When an affirmative determination is made in step S4, step S5 is performed such that the disengagement side hydraulic pressure is maintained at a constant value, and it is determined in step S6 whether the hydraulic pressure of the engagement side frictional engagement device, that is, the low speed side frictional engagement device has reached the predetermined value. The engagement side hydraulic pressure is gradually increased from the hydraulic pressure immediately before the torque capacity is generated by the linear solenoid value or the like. The predetermined value in step S6 is a hydraulic pressure value at which the engagement side frictional engagement device has a torque capacity which prevents the turbine speed from decreasing even when the disengagement side frictional engagement device is disengaged. For example, a constant value is set for each type of downshifting. Then, when an affirmative determination is made in step S6, step S7 is performed such that the engagement side hydraulic pressure is drained at a constant rate, and it is determined whether the disengagement side hydraulic pressure becomes zero in step S8. When the disengagement side hydraulic pressure is zero, the disengagement side hydraulic pressure control ends. In FIG. 10, time $t_3$ is a time at which the hydraulic pressure $P_{C1}$ of the engagement side clutch C1 has increased to the predetermined value and an affirmative determination is made in step S6. Time $t_4$ is a time at which the hydraulic pressure $P_{B1}$ of the disengagement side brake B1 becomes zero and an affirmative determination is made in step S8. The hydraulic pressure PC1 of the clutch C1, which is an engagement side frictional engagement device, that is, the low speed side frictional engagement device, is increased promptly such that the clutch C1 is fully engaged, when the turbine speed NT has reached the predetermined value with respect to a synchronous rotational speed after downshifting.

When the disengagement side hydraulic pressure is controlled in this manner, it is possible to prevent occurrence of shift shock as a result of temporary decreases in the turbine speed NT and the engine speed NE due to the neutral state of the automatic transmission, during downshifting at the time of coasting. Also, it is possible to prevent deterioration of fuel economy as a result of cancellation of fuel cut and restart of fuel supply during downshifting at the time of coasting.

Figure 12:
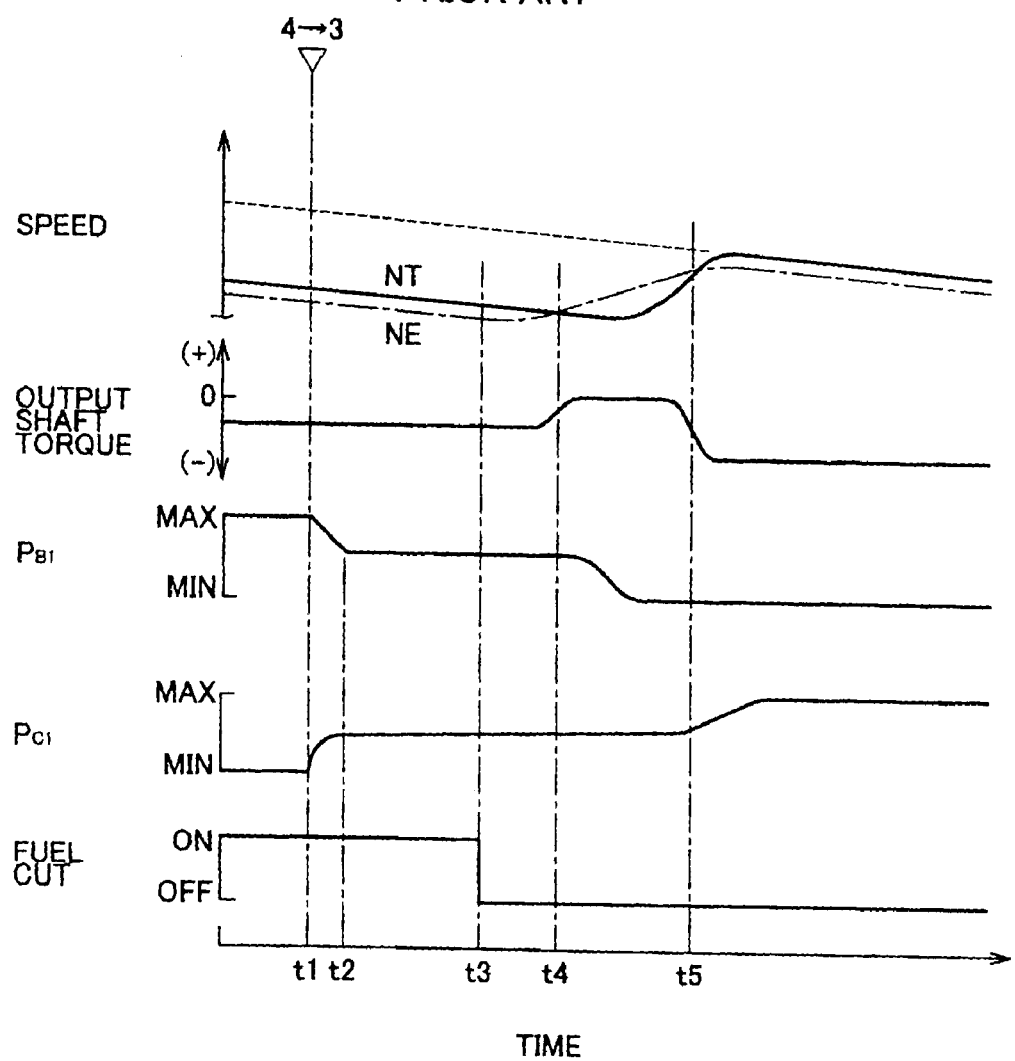
FIG. 12 is an example of a time chart explaining changes in the operation states of the various portions when hydraulic control is continuously performed in the case where fuel cut is cancelled while the disengagement side hydraulic pressure is controlled according to the flowchart in FIG. 8.

Meanwhile, when fuel cut is cancelled by accelerator operation or the like during control of the disengagement side hydraulic pressure, and fuel supply by the fuel injection valve 92 is restarted, even if the engine speed NE increases as shown in FIG. 12, an increase in the turbine speed NT is hindered by engagement of the disengagement side brake B1, and the turbine speed NT is increased rapidly after the brake B1 is disengaged. Accordingly, the turbine speed NT and the engine speed NE cross each other at a large cross angle, and a large torque fluctuation occurs and the shifting time increases. The description concerning time $t_1$, time $t_2$ in FIG. 12 is the same as that in FIG. 10. Time $t_3$ is a time at which fuel cut is cancelled. Time $t_4$, time $t_5$ are times at which the turbine speed NT and the engine speed NE cross each other at a large cross angle, and driving/driven states thereof are changed. The slip control by the coasting time LIU slip control device 120 is cancelled when fuel cut is cancelled, and the lockup clutch 32 is disengaged.

Figure 9:
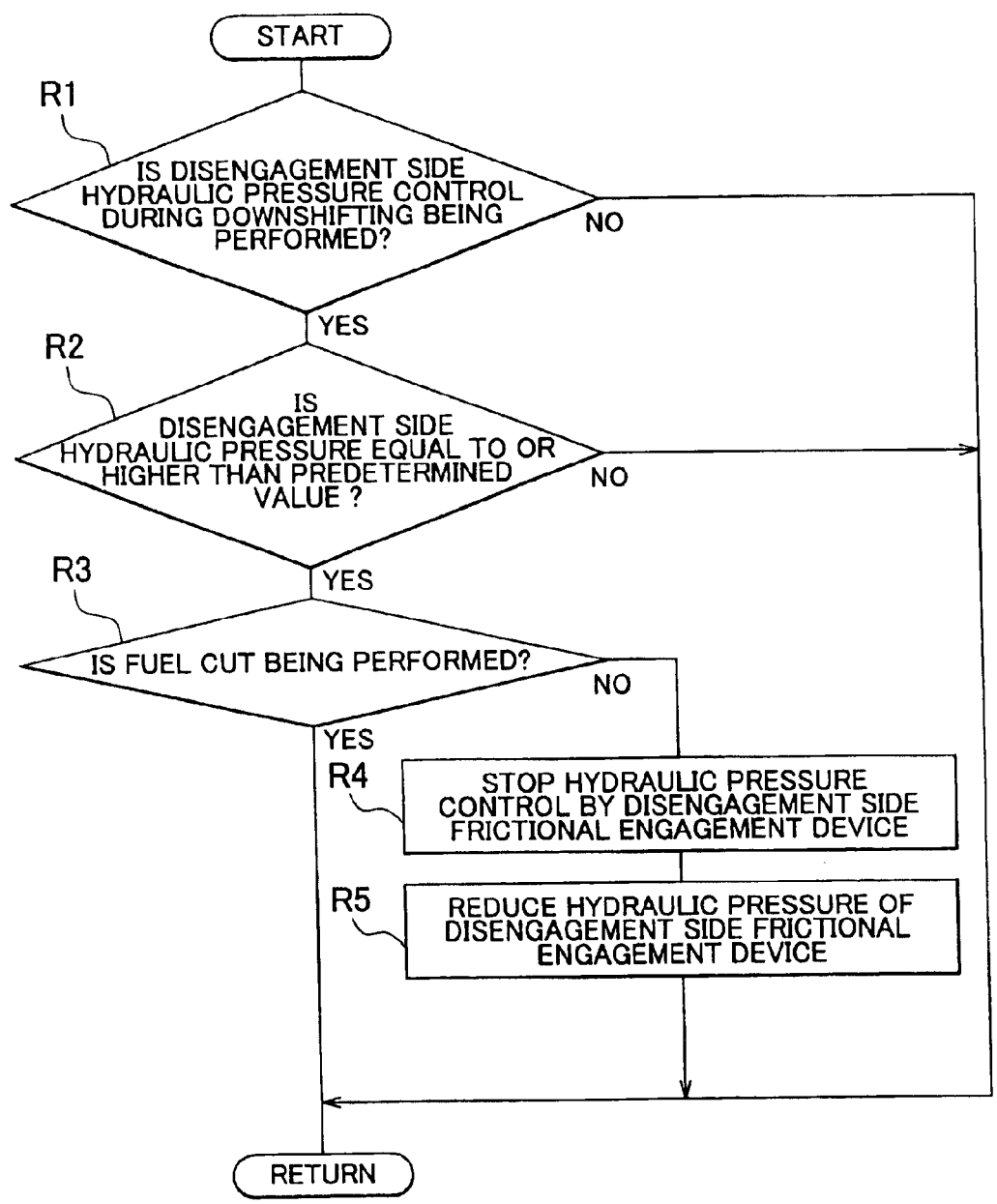
FIG. 9 is a flowchart specifically explaining processes performed by a coasting-downshifting time disengagement hydraulic pressure reducing device in FIG. 5.

In the embodiment, the coasting-downshifting time disengagement hydraulic pressure reducing device 114 is provided, and a signal processing is performed by the coasting-downshifting time disengagement hydraulic pressure reducing device 114 according to the flowchart in FIG. 9 in parallel with a signal process by the coasting-downshifting time disengagement hydraulic pressure reducing device 114. In step R1 in FIG. 9, it is determined whether disengagement side hydraulic pressure control during downshifting is being performed, that is, whether the coasting-downshifting time disengagement hydraulic pressure control device 112 is performing steps S3 to S8 in FIG. 8, using a control execution flag or the like. When an affirmative determination is made, step R2 is performed, and it is determined whether the disengagement side hydraulic pressure is equal to or higher than a predetermined value. More particularly, it is determined whether the disengagement side frictional engagement device has a torque capacity which hinders the increase in the turbine speed NT, for example, whether the hydraulic pressure is equal to or higher than the disengagement side hydraulic pressure which is maintained at a constant value in step S5. When an affirmative determination is made, step R3 is performed.

Figure 11:
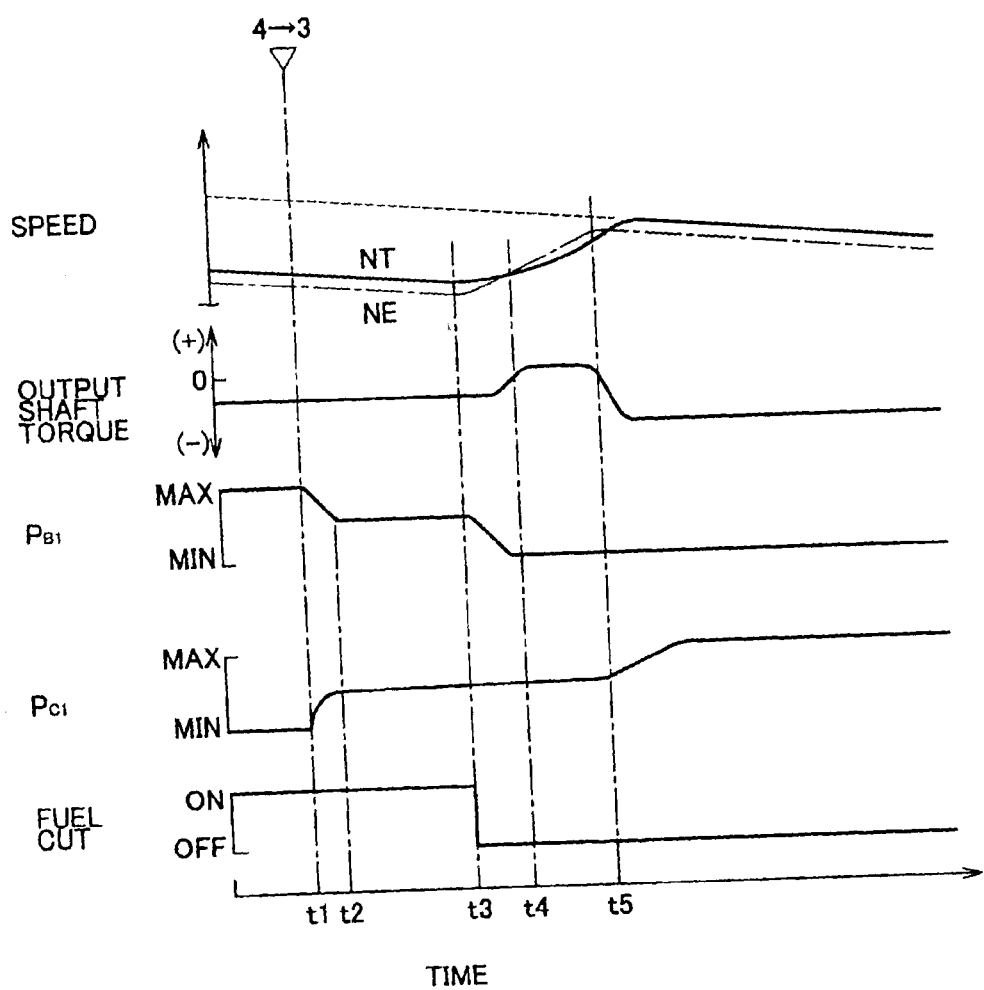
FIG. 11 is an example of a time chart explaining changes in the operation states of the various portions when fuel cut is cancelled while a disengagement side hydraulic pressure is controlled according to the flowchart in FIG. 8 and the disengagement side hydraulic pressure is immediately reduced according to the flowchart in FIG. 9.

In step R3, it is determined whether fuel cut by the fuel cut device 102 is being performed using the control execution flag or the like. When it is determined that fuel cut is being performed, the process ends. On the other hand, when it is determined that fuel cut is cancelled, steps R4, R5 are performed. In step R4, hydraulic pressure control by the disengagement side frictional engagement device by the coasting-downshifting time disengagement hydraulic pressure control device 112 is stopped. In step R5, the hydraulic pressure of the disengagement side frictional engagement device is reduced immediately so as to decrease the torque capacity to substantially zero. Thus, an increase in the input side turbine speed NT is permitted, and the turbine speed NT is increased promptly based on an increase in the engine speed NE due to restart of fuel supply caused by cancellation of fuel cut and the engagement torque capacity of the clutch C1. FIG. 11 corresponds to FIG. 12. Since the hydraulic pressure $P_{B1}$ of the disengagement side brake B1 is reduced due to cancellation of the fuel cut at time $t_3$, the turbine speed NT is increased promptly. Accordingly, the cross angle of the turbine speed NT and the engine speed NE decreases, or the cross angle disappears. As a result, shift shock due to torque fluctuation is reduced, and the shifting time decreases.

As mentioned above, in the embodiment, in the case where fuel supply is stopped by the fuel cut device 102, downshifting at the time of coasting is output, the disengagement side frictional engagement device (the brake B1 in downshifting from fourth speed to third speed) is maintained in the engagement state by the coasting-downshifting time disengagement hydraulic pressure device 112, when the control by the fuel cut device 102 is cancelled and fuel supply is restarted, control by the coasting-downshifting time disengagement hydraulic pressure control device 112 is stopped by the coasting-downshifting time disengagement hydraulic pressure reducing device 114 and the hydraulic pressure of the disengagement side frictional engagement device is reduced immediately, and the torque capacity is decreased to substantially zero. Accordingly, the input rotational speed of the automatic transmission 14, that is, the turbine speed NT is increased promptly by an increase in the engine speed NE due to the restart of fuel supply to the engine 10 and the engagement torque capacity of the engagement side frictional engagement device (the clutch C1 in downshifting from fourth speed to third speed). As a result, an occurrence of the shift shock and an increase in the shifting time are prevented.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A driving control apparatus for a vehicle, comprising:
an engine which generates power by fuel combustion;
a transmission which changes engagement/disengagement states of plural frictional engagement devices so as to realize plural shift speeds whose gear ratios are different from each other;
a fuel cut device which stops fuel supply to the engine when a predetermined fuel cut condition including a condition that the vehicle is coasting with a throttle valve of the engine being fully closed is satisfied;
a coasting time disengagement restricting device which maintains a high speed side frictional engagement device in an engagement state until a low speed side frictional engagement device obtains a predetermined torque capacity at a time of automatic downshifting of the transmission during coasting; and a disengagement restriction stop device which stops control by the coasting time disengagement restricting device so as to reduce a torque capacity of the high speed side frictional engagement device, when control by the fuel cut device is cancelled and fuel supply is restarted in a case where downshifting of the transmission is output while fuel supply is stopped by the fuel cut device and the high speed side frictional engagement device is maintained in the engagement state by the coasting time disengagement restricting device.

2. The driving control apparatus for a vehicle according to claim 1, wherein, in a case where downshifting of the transmission is output while fuel supply is stopped by the fuel cut device, and the high speed side frictional engagement device is maintained in the engagement state by the coating time disengagement restricting device, when control by the fuel cut device is cancelled and fuel supply is restarted, the disengagement restriction stop device stops control by the coasting time disengagement restricting device and reduces a torque capacity of the high speed side frictional engagement device to substantially zero.

3. The driving control apparatus for a vehicle according to claim 1, wherein a fuel cut start condition for stopping fuel supply to the engine is the same as a fuel cut cancellation condition for restarting the fuel supply in the fuel cut device.

4. The driving control apparatus for a vehicle according to claim 1, wherein an engine speed in a fuel cut start condition for stopping the fuel supply to the engine is higher than an engine speed in a fuel cut cancellation condition for restarting fuel supply by a predetermined value in the fuel cut device.

5. The driving control apparatus for a vehicle according to claim 1, wherein an engine speed in a fuel cut start condition for stopping the fuel supply to the engine is higher than an engine speed in a fuel cut cancellation condition for restarting the fuel supply by a predetermined rate in the fuel cut device.

6. The driving control apparatus for a vehicle according to claim 1, wherein a fuel cut start condition for stopping the fuel supply to the engine includes a condition that an operation amount of an accelerator pedal has been substantially zero for a predetermined time or more.

7. A driving control apparatus for a vehicle, comprising:
an engine which generates power by fuel combustion;
a transmission which changes engagement/disengagement states of plural frictional engagement devices so as to realize plural shift speeds whose gear ratios are different from each other; and
a controller which stops fuel supply to the engine when a predetermined fuel cut condition including a condition that the vehicle is coasting with a throttle valve of the engine being fully closed is satisfied; which maintains a high speed side frictional engagement device in an engagement state until a low speed side frictional engagement device obtains a predetermined torque capacity at a time of automatic downshifting of the transmission during coasting; and which stops control for maintaining the high speed side frictional engagement device in the engagement state during coasting, and reduces a torque capacity of the high speed side frictional engagement device when control of fuel cut is cancelled and fuel supply is restarted in a case where downshifting of the transmission is output while fuel supply is stopped and the high speed side frictional engagement device is maintained in the engagement state.

8. The driving control apparatus for a vehicle according to claim 7, wherein the controller stops control for maintaining the high speed side frictional engagement device in the engagement state during coasting, and reduces a torque capacity of the high speed side frictional engagement device to substantially zero when control of fuel cut is cancelled and fuel supply is restarted in the case where downshifting of the transmission is output while fuel supply is stopped and the high speed side frictional engagement device is maintained in the engagement state.

9. A control method of a driving control apparatus for a vehicle including an engine which generates power by fuel combustion, a transmission which changes engagement/disengagement states of plural frictional engagement devices so as to realize plural shift speeds whose gear ratios are different from each other, comprising the steps of:
stopping fuel supply to the engine when a predetermined fuel cut condition including a condition that the vehicle is coasting with a throttle valve of the engine being fully closed is satisfied;
maintaining a high speed side frictional engagement device in an engagement state until a low speed side frictional engagement device obtains a predetermined torque capacity at the time of automatic downshifting of the transmission during coasting; and
stopping control for maintaining the engagement state of the high speed side frictional engagement device during coasting so as to reduce the torque capacity of the high speed side frictional engagement device when control of the fuel cut is cancelled and fuel supply is restarted in a case where downshifting of the transmission is output while fuel supply is stopped and the high speed side frictional engagement device is maintained in the engagement state.

10. The control method of the driving control vehicle for a vehicle according to claim 9, further comprising the steps of:
stopping control for maintaining the high speed side frictional engagement device in the engagement state during coasting so as to reduce a torque capacity of the high speed side frictional engagement device to substantially zero when control of fuel cut is cancelled and fuel supply is restarted in a case where downshifting of the transmission is output while fuel supply is stopped and the high speed side frictional engagement device is maintained in the engagement state.

11. The control method of the driving control apparatus for a vehicle according to claim 9, wherein a fuel cut start condition for stopping fuel supply to the engine is the same as a fuel cut cancellation condition for restarting the fuel supply.

12. The control method of the driving control apparatus for a vehicle according to claim 9, wherein an engine speed in a fuel cut start condition for stopping fuel supply to the engine is higher than an engine speed in a fuel cut cancellation condition for restarting the fuel supply by a predetermined value.

13. The control method of the driving control apparatus for a vehicle according to claim 9, wherein an engine speed in a fuel cut start condition for stopping the fuel supply to the engine is higher than an engine speed in a fuel cut cancellation condition for restarting the fuel supply by a predetermined rate.

14. The control method of the driving control apparatus for a vehicle according to claim 9, wherein a fuel cut start condition for stopping the fuel supply to the engine is a condition that an operation amount of an accelerator pedal has been substantially zero for a predetermined time or more.

* * * * *